(12) United States Patent
Etuve et al.

(10) Patent No.: US 9,657,405 B2
(45) Date of Patent: May 23, 2017

(54) REMOVABLE MASK FOR A TURBOMACHINE BLADE OR DISTRIBUTOR SECTOR PLATFORM

(75) Inventors: Pascal Etuve, Dissay (FR); Frederic Lagrange, Avanton (FR); Patrick Marquereau, Chatellerault (FR); Pascal Sainz, Vaux/Vienne (FR)

(73) Assignee: SNECMA, Paris (FR)

( * ) Notice: Subject to any disclaimer, the term of this patent is extended or adjusted under 35 U.S.C. 154(b) by 763 days.

(21) Appl. No.: 13/643,104

(22) PCT Filed: Apr. 14, 2011

(86) PCT No.: PCT/FR2011/050863
§ 371 (c)(1),
(2), (4) Date: Oct. 24, 2012

(87) PCT Pub. No.: WO2011/135226
PCT Pub. Date: Nov. 3, 2011

(65) Prior Publication Data
US 2013/0045096 A1     Feb. 21, 2013

(30) Foreign Application Priority Data

Apr. 29, 2010 (FR) ...................... 10 53324

(51) Int. Cl.
*C25D 5/02* (2006.01)
*F01D 5/28* (2006.01)
(Continued)

(52) U.S. Cl.
CPC ............. *C25D 5/022* (2013.01); *F01D 5/288* (2013.01); *B29C 45/00* (2013.01);
(Continued)

(58) Field of Classification Search
CPC . F01D 5/28; F01D 5/286; F01D 5/288; F05D 2300/611; F05D 2230/90;
(Continued)

(56) References Cited

U.S. PATENT DOCUMENTS 3,527,649 A   9/1970  Barile
4,650,625 A   3/1987  Pentlow
(Continued)

FOREIGN PATENT DOCUMENTS

| EP | 1 403 469 | 3/2004 |
|----|-----------|--------|
| EP | 1 970 257 | 9/2008 |
| WO | 99 24647  | 5/1999 |

OTHER PUBLICATIONS

International Search Report Issued Aug. 30, 2011 in PCT/FR11/050863 Filed Apr. 14, 2011.

*Primary Examiner* — Dwayne J White
*Assistant Examiner* — Adam W Brown
(74) *Attorney, Agent, or Firm* — Oblon, McClelland, Maier & Neustadt, L.L.P.

(57) ABSTRACT

A removable mask for a platform or a nozzle sector of a turbine engine blade, the blade or sector configured to be covered in an electrolytic deposit, the mask including a mechanism to engage on the platform and a mechanism to cover outer surfaces of the platform that are not to be covered by the electrolytic deposit.

8 Claims, 3 Drawing Sheets

(51) Int. Cl.
 *B29C 45/00* (2006.01)
 *B29K 75/00* (2006.01)
(52) U.S. Cl.
 CPC ...... *B29K 2075/00* (2013.01); *F05D 2230/90* (2013.01); *F05D 2260/95* (2013.01); *F05D 2300/611* (2013.01)
(58) Field of Classification Search
 CPC . F05D 2260/95; C25D 5/022; B29K 2075/00; B29C 45/00
 See application file for complete search history.

(56) References Cited

U.S. PATENT DOCUMENTS

| | | | | |
|---|---|---|---|---|
| 4,978,558 | A * | 12/1990 | Lamm | 427/250 |
| 5,935,407 | A | 8/1999 | Nenov et al. | |
| 6,194,086 | B1 | 2/2001 | Nenov et al. | |
| 6,224,673 | B1 * | 5/2001 | Das | C23C 8/04 118/500 |
| 6,296,705 | B1 * | 10/2001 | Ireland et al. | 118/505 |
| 6,419,753 | B1 * | 7/2002 | Wheat | C23C 10/04 118/500 |
| 6,652,914 | B1 | 11/2003 | Langley et al. | |
| 7,632,541 | B2 * | 12/2009 | Saylor | C23C 10/04 427/248.1 |
| 2002/0172808 | A1 | 11/2002 | Wustman et al. | |
| 2003/0180498 | A1 | 9/2003 | De Winter et al. | |
| 2006/0021579 | A1 * | 2/2006 | Bernaski et al. | 118/720 |
| 2007/0110910 | A1 * | 5/2007 | Beck et al. | 427/421.1 |

* cited by examiner

REMOVABLE MASK FOR A TURBOMACHINE BLADE OR DISTRIBUTOR SECTOR PLATFORM

BACKGROUND OF THE INVENTION

Field of the Invention

The present invention relates to a removable mask for a platform of a blade or a nozzle sector of a turbine engine, the blade or sector being for covering in an electrolytic deposit.

Description of the Related Art

During fabrication, the blades or the elements making up a high-pressure nozzle of a turbine engine such as an airplane turboprop or turbojet are covered in an electrolytic deposit of an underlayer for bonding an outer layer of ceramic. The ceramic layer needs to be deposited on those outer surfaces of the blades or of the nozzle that are situated in the stream of gas flowing stream through the turbine engine, i.e.: for blades on the pressure and suction sides of the airfoils and on the radially-outer surfaces of the platforms; and for a nozzle, on the pressure and suction sides of vanes, on the radially-inner surfaces of the outer platforms, and on the radially-outer surfaces of the inner platforms. The other outer surfaces of blades or of the nozzle, i.e. the surfaces of their platforms that do not lie in the gas flow stream, are not covered in ceramic, so there is therefore not any need to deposit the above-mentioned bonding underlayer on those surfaces.

The surface of each platform that is to be covered in ceramic is connected via a connecting edge (substantially of parallelogram shape) to a peripheral surface that extends substantially perpendicularly to the above-mentioned surface of the platform and that is not to be covered in ceramic.

In general, the blade or the nozzle is made as a one-piece casting. The surfaces of the blade or of the nozzle that are to be covered in ceramic are not rectified by machining. The above-mentioned peripheral surface of each platform is rectified in order to have accurate dimensions.

The bonding underlayer for the ceramic layer is generally based on platinum, which is a metal that is very expensive. It is therefore important to avoid depositing that substance on those surfaces of the platforms that lie outside the gas flow stream, in order to limit the cost of fabricating the blades or the nozzle.

In the prior art, two technologies are used for masking the above-mentioned surfaces of the platforms of blades or nozzles during an electrolytic deposition operation.

The first technology consists in casing wax directly onto the platforms in order to mask their outer surfaces that are not to be covered in platinum.

The second technology consists in sticking adhesive tapes on the surfaces that are to be masked.

Nevertheless, those technologies are not satisfactory since they are lengthy and expensive to implement and since it is found that platinum manages to infiltrate between the platforms and the adhesive tapes or between the platforms and the wax, in particular because both adhesive tapes and wax deform during electrolytic deposition. Those technologies are also sources of problems of hygiene and safety, in particular because they involve using toxic substances for cleaning together with a blade for cutting the adhesive tapes.

Furthermore, those technologies are not suitable for covering the surfaces for masking in accurate manner, and in particular for masking the above-mentioned peripheral surface of each platform, since the masking means used may either project beyond the outer surface of a platform that is to be covered in an electrolytic deposit, thereby masking a portion of that surface, or on the contrary they may be set back from said surface, thereby leaving free portions of the peripheral surface that then become covered in the electrolytic deposit.

Finally, those technologies do not make it possible to guarantee that the electrolytic deposit is uniform over the outer surface of the platform of a blade or of a nozzle, in particular at its periphery. It is very difficult to position the wax or the adhesive tape on the peripheral surface of the platform in such a manner that the top edge face of the wax or of the tape is flush with and in alignment with the outer surface of the platform that is exposed to hot gas in operation. The top edge face of the wax or of the tape is generally situated a little below or a little above the outer surface of the part, which can lead to infiltrations or to excess electrolytic deposit along the side edge faces of the platform.

The quantity of platinum deposited electrolytically on a nozzle is generally about 4 grams (g) with a tolerance of ±0.15 g. The above-mentioned infiltrations can lead to an increase of electrolytic deposition of platinum of more than 0.15 g, which represents a significant financial loss.

BRIEF SUMMARY OF THE INVENTION

A particular object of the invention is to provide a solution to the problems of the prior art that is simple, effective, and inexpensive.

To this end, the invention provides a removable mask for a platform of a blade or a nozzle sector of a turbine engine, the blade or sector being designed to be coated in an electrolytic deposit and including at least one airfoil and at least one platform having an outer surface connected via an edge to a peripheral surface of the platform, which peripheral surface is substantially perpendicular to the outer surface, the mask being characterized in that it includes means for engagement on the platform and a peripheral rim for covering the peripheral surface of the platform, the peripheral rim including at least one side surface for bearing in leaktight manner against the peripheral surface of the platform and a free outer surface flush with the outer surface of the platform along the above-mentioned edge.

The mask of the invention is flexible or semirigid and is made, prior to use on the part for coating, thereby making it possible to reduce the time required for putting the mask into place on the blade or the nozzle sector. Furthermore, the mask is easily engaged on the blade or the nozzle sector and can easily be removed therefrom. It takes much less time to mask a nozzle sector than is required for masking a nozzle sector using prior art technology.

Furthermore, the mask of the invention can be reused for masking a plurality of identical blades or nozzle sectors in succession. This makes it possible significantly to reduce the cost associated with masking the platforms of turbine engine blades or nozzle sectors prior to subjecting them to electrolytic deposition.

The mask of the invention fits on the portion of the blade or nozzle sector platform that is to be masked without clearance and it prevents any material infiltrating between the mask and the platform during electrolytic deposition. The edges of the surfaces of the platform that are to be coated are defined accurately by the mask of the invention, thereby making it possible to obtain clear-cut ends to the electrolytic deposit at said edges. This makes it possible to limit losses of electrolytic substance and to reduce deposition tolerances for that substance.

Furthermore, according to a characteristic of the invention, the peripheral rim of the mask that covers the peripheral surface of the platform prevents infiltrations and terminates exactly level with the outer surface of the platform, extending it. This makes it possible to remedy the above-mentioned problem and to ensure electrolytic deposition that is uniform over the outer surface of the platform, in particular at its periphery.

The peripheral surface of the platform, which is rectified by machining, has dimensions that are accurate and is of good surface state, thereby making it easier for the above-mentioned rim of the mask to be positioned on said surface and to bear thereagainst in leaktight manner.

During electrolytic deposition, the mask may shrink onto the platform, thereby preventing any infiltration between the mask and the platform.

Advantageously, the mask of the invention is made of a plastics material, e.g. of polyurethane. It is preferably elastically deformable and made as a single piece.

The mask may include a recess into which the platform is to be engaged as a tight fit in order to prevent the electrolytic substance from infiltrating between the mask and the platform.

The side faces of the recess bear against the side faces of the platform.

The recess may be generally in the shape of a rectangular parallelepiped.

The recess may include at least one cavity for housing a root of the blade or an attachment flange of the nozzle sector.

The mask of the invention may include or form grip means for holding the blade or the nozzle sector during electrolytic deposition.

The free outer surface of the peripheral rim of the mask may be non-plane.

The outer and peripheral surfaces of the platform are connected together via a first connection edge, the side and outer surfaces of the covering rim are connected together by a second connection edge, and the first and second connection edges advantageously bear against each other or in the immediate vicinity of each other, thereby limiting or preventing the above-mentioned infiltrations. The connecting edges may be substantially parallelogram-shaped.

Advantageously, the mask of the invention has a plurality of tabs that can be removed, e.g. by being cut off, independently of one another, with the number of tabs being equal to the recommended number of uses of the mask.

When the mask is suitable for being used 30 times without its material deteriorating, then the mask has 30 independent tabs. Each time the mask is used, e.g. each time the mask and the part are dipped into a bath of electrolyte, an operator cuts off a tab, e.g. using a sharp blade. The operator can thus easily determine the number of recommended uses that remain for a mask, as given by the number of tabs remaining on the mask. A mask that originally had 30 tabs and now only has ten, is good for ten more uses. The tabs thus form means for providing information about the number of recommended uses of the mask that remain and thus about the degree of wear of the mask. When a mask has no tabs left, it may be discarded. This makes it possible to guarantee that the mask has a good material state and to ensure proper sealing between the mask and the part it is to protect. A mask may have five to 50 tabs, preferably ten to 40 tabs, and for example it may have 20 to 30 tabs of the above-mentioned type.

The present invention also provides a turbine engine blade having an airfoil connected to a platform and characterized in that a mask as described above is engaged on said platform.

The invention also provides a turbine engine nozzle sector having two platforms, respectively an inner platform and an outer platform, with one or more vanes extending therebetween, the sector being characterized in that a mask of the above-specified type is engaged on each of the platforms.

Finally, the invention provides a method of fabricating a mask of the above-specified type, the method being characterized in that it comprises a step consisting in making the mask by injection molding between a mold and a counter-mold that reproduces the shapes and the dimensions of the platform.

The mold and the countermold may be made of a material such as Bakelite®, steel, aluminum, etc., for example.

BRIEF DESCRIPTION OF THE SEVERAL VIEWS OF THE DRAWINGS

The invention can be better understood and other details, characteristics, and advantages thereof appear more clearly on reading the following description made by way of non-limiting example and with reference to the accompanying drawings, in which.

DETAILED DESCRIPTION OF THE INVENTION

Figure 1:
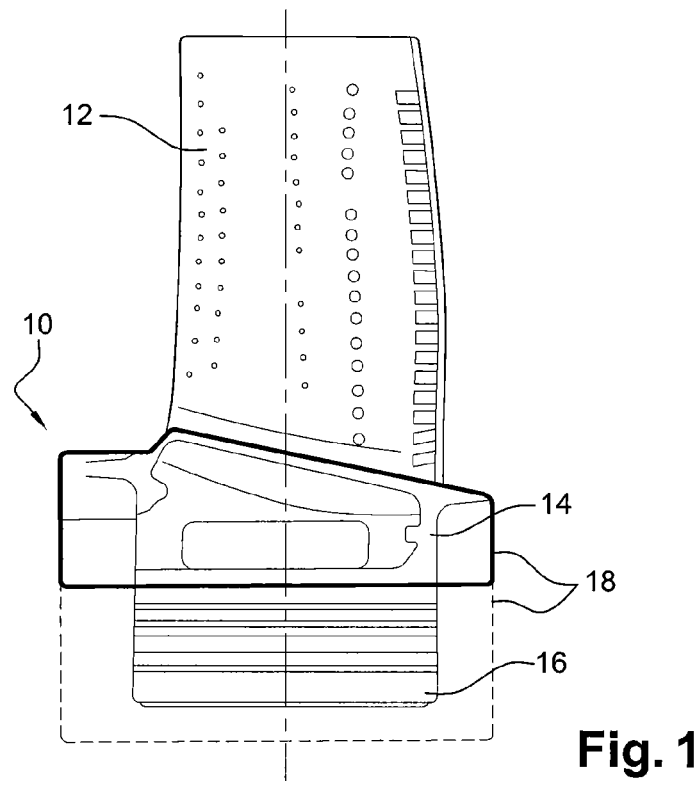
FIG. 1 is a diagrammatic side view of a turbine engine blade with the position of a mask of the invention being shown in highly diagrammatic manner on the platform of the blade.

Reference is made initially to FIG. 1, which shows a blade 10 of a turbine engine, such as an airplane turboprop or turbojet, the blade having an airfoil 12 connected at its radially-inner end via a platform 14 to a root 16. The blade 10 is for mounting on a rotor disk of the turbine engine, by engaging its root 16 in a slot of complementary shape in the periphery of the disk.

Those outside surfaces of the airfoil 12 and of the blade platform 14 that are situated in the stream of gas flowing through the turbine engine while it is in operation are designed to be covered in a layer of ceramic. A platinum-based underlayer is deposited electrolytically on those surfaces in order to ensure that the ceramic layer bonds thereto.

In order to save on the expensive material of this underlayer, those outside surfaces of the platform 14 and also of the root 16 that are not exposed to the hot gas in operation and that are therefore not to be covered in ceramic are protected by a mask 18 of the invention so as to prevent the substance infiltrating between the mask and the portions of the blade that are to be masked.

Figure 2:
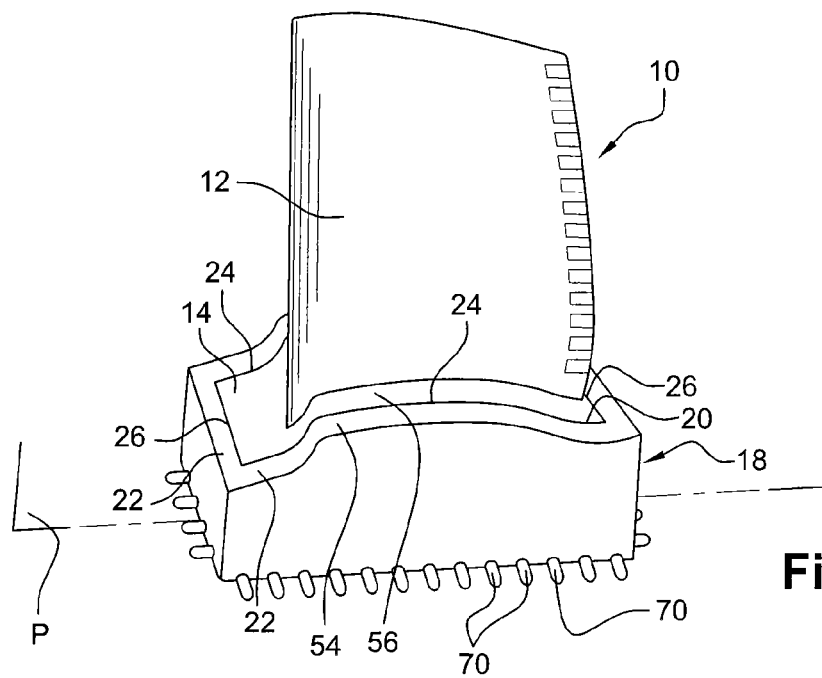
FIG. 2 is a diagrammatic perspective view of a turbine engine blade fitted with a mask of the invention.

The mask 18, which is more visible in FIG. 2, includes means for engaging on the platform 14 of the blade 10, and also means for covering the above-mentioned surfaces of the platform and of the root 16 on which there is no need for electrolytic deposition to take place.

The mask 18 in this example is in the form of a single piece of rectangular parallelepiped shape, having a recess 20 in which the platform 14 of the blade is engaged as a tight fit. The side faces 22 of this recess bear against the side faces 24, 26 of the platform so as to prevent the covering substance from infiltrating, as explained above.

The mask 18 is made of an elastically deformable plastics material, such as polyurethane, so as to make it easier to put into place and remove.

Figure 3:
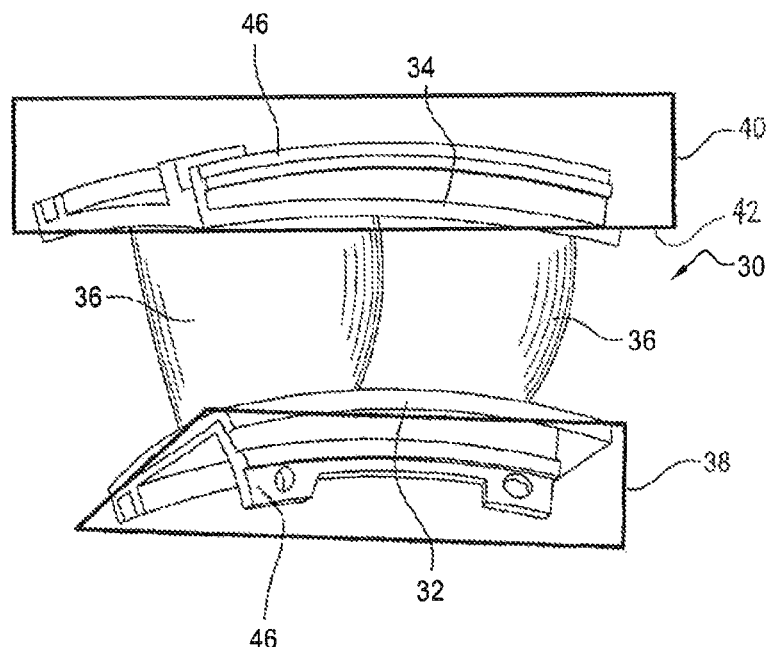
FIG. 3 is a diagrammatic perspective view of a sector of a turbine engine nozzle with the positions of masks of the invention being shown in highly diagrammatic manner on the platforms of the sector.

FIG. 3 shows a sector 30 of a turbine engine nozzle, having two platforms 32 and 34, respectively an inner platform and an outer platform, with vanes 36 extending between them, there being two vanes in the example shown.

Each platform 32, 34 of the nozzle sector is to be protected by a mask 38, 40 of the invention in order to prevent the covering substance from infiltrating between the mask and the corresponding platform, and in order to prevent the substance from being deposited on those surfaces of the platform that are not exposed to hot gas in operation.

Figure 4:
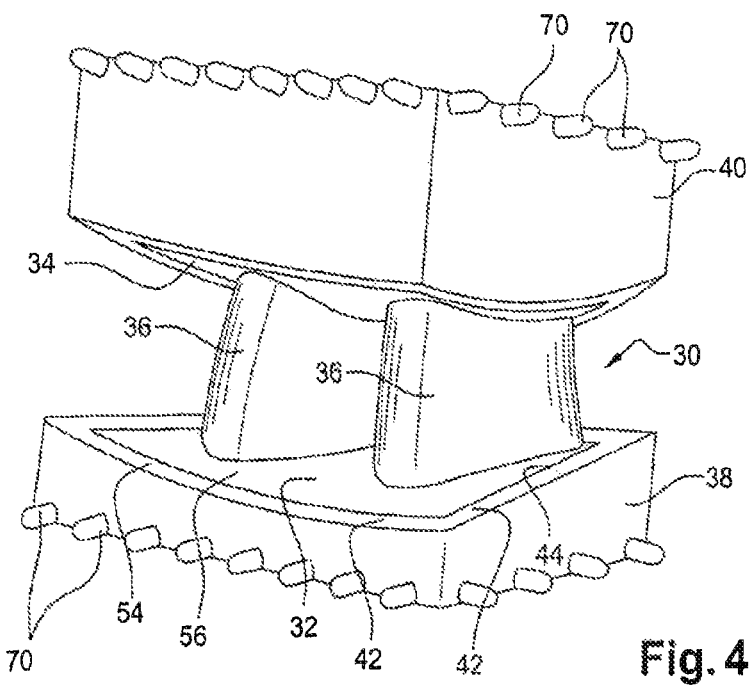
FIG. 4 is a diagrammatic perspective view of a sector of a turbine engine nozzle fitted with masks of the invention.

As can be seen better in FIG. 4, the masks 38 and 40 are similar to the above-described mask 18, each including a recess 44 in which a platform 32, 34 is engaged. The side faces 42 of the recess bear against the side faces of the corresponding platform. The recess in each mask 38, 40 includes at least one cavity for housing an attachment flange 46 of the corresponding platform 32, 34 of the nozzle.

Figure 5:
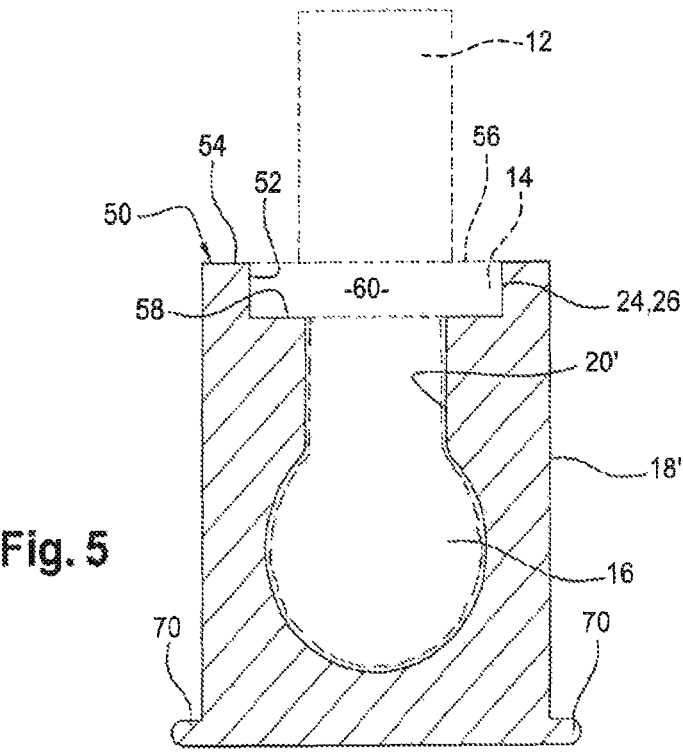
FIG. 5 is a diagrammatic section view of a mask of the invention engaged on both the root and the platform of a turbine engine blade.

FIG. 5 is a diagrammatic cross-section view of a mask 18' similar to that of FIG. 2, the mask 18' being engaged on the platform 14 and the entire root 16 of a blade, which root is dovetail-shaped in this example.

The mask 18' includes a recess 20' of shape complementary to the blade root 16.

The mask 18' has an outer peripheral rim 50 that serves to extend along the side faces 24, 26 of the platform 14, and it includes a side face 52 for bearing against these side faces. These side faces 24, 26 define a peripheral surface that extends substantially perpendicularly to the outer surface 56 of the platform, i.e. the surface of the platform that is exposed to gas while the turbine engine is in operation. This outer surface 56 needs to be covered in an electrolytic deposit, whereas the peripheral surface defined by the faces 24 and 26 needs to be masked.

The free end surface 54 of the peripheral rim 50 of the mask is in alignment with and extends the outer surface 56 of the platform. In other words, the free end surface 54 of the peripheral rim 50 is flush with the outer surface 56 of the platform. In FIGS. 2 and 4, this free outer surface is not plane.

The side face 52 of the peripheral rim 50 of the mask is connected at its inner end to an inner bearing face 58 of the platform 14, which face is to extend along the side faces 24, 26 of the platform substantially parallel to the above-mentioned end surface 54 of the platform. The inner faces 52 and 58 of the mask define between them an internal cavity 60 in which the platform 14 of the blade is installed as a tight fit.

Figure 6:
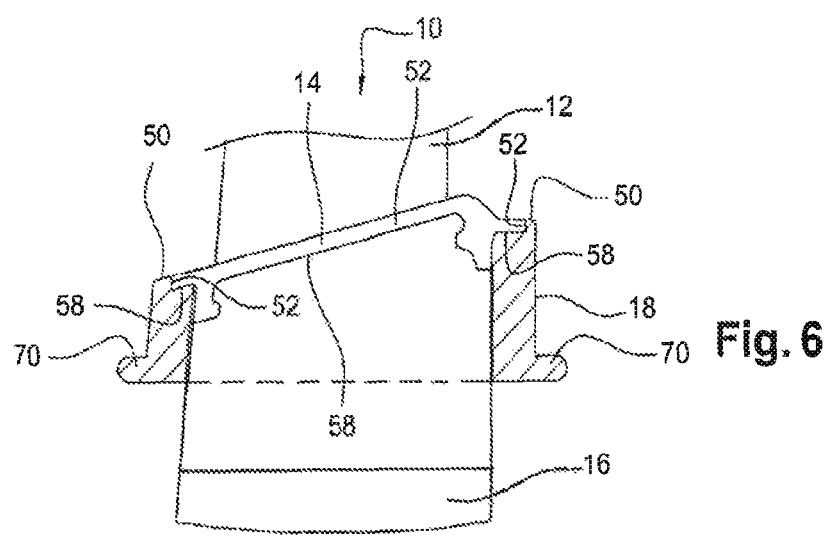
FIG. 6 is a diagrammatic section view on a plane P showing the FIG. 2 mask.

FIG. 6 is a section view of the mask 18 of FIG. 2, on the plane P. The free outer surface of the peripheral rim 50 of the mask is not plane and it is designed to be flush with the outer surface 56 of the platform 14 of the blade, as can be seen in FIG. 2.

As shown in FIG. 5, the peripheral rim of the mask 18 in FIG. 6 includes a bearing side face 52 that is connected to a bearing inner face 58, these faces 52 and 58 defining between them a cavity into which the platform of the blade is inserted as a tight fit.

The above-described masks advantageously include tabs 70 formed integrally with the above-mentioned engagement and covering means (FIGS. 4, 5, and 6).

In the examples shown, these tabs 70 are situated on the outer peripheral surface of each mask, in the vicinity of its end remote from the recess in the mask. The tabs 70 extend all around the periphery of the mask and they are regularly spaced apart. They are of a length of a few millimeters and they may be cut off by a knife or other blade at their bases, i.e. at their ends that are connected to the mask. The number of tabs corresponds to the recommended number of times the mask should be used, as explained above.

The invention claimed is:

1. An assembly comprising:
a removable mask; and
one of a blade and a nozzle sector of a turbine engine, the blade and nozzle sector each including at least one airfoil and at least one platform and, respectively, a blade root and an attachment flange of the platform, the at least one platform having an outer surface connected via an edge to a peripheral surface of the platform, which peripheral surface is substantially perpendicular to the outer surface,
wherein the removable mask comprises a peripheral rim covering the peripheral surface of the platform, the peripheral rim including a side surface connected at an inner end to an inner surface of the removable mask substantially transverse to said side surface,
wherein the one of the blade and nozzle sector is adapted to be coated in an electrolytic deposit using an electrolytic substance,
wherein the removable mask includes a cavity comprising a first cavity portion in which the at least one platform is engaged and which is defined by the side surface and the inner surface against both of which bears said at least one platform, so as to prevent the electrolytic substance from infiltrating between the removable mask and the platform,
wherein the cavity further comprises a second cavity portion which accommodates one of the blade root and the attachment flange of the platform and which has a shape complementary to a shape thereof, wherein said one of the blade root and the attachment flange is engaged in the second cavity as a tight fit, and
wherein said one of the blade root and the attachment flange has an undercut and the removable mask is made as a single piece of plastics material and is elastically deformable, so that removing the removable mask from said one of the blade root and the attachment flange requires elastically deforming the removable mask.

2. The assembly according to claim 1, wherein the mask is made of polyurethane.

3. The assembly according to claim 1, wherein the free end surface of the peripheral rim of the mask is not plane.

4. The assembly according to claim 1, wherein the side and free end surfaces of the peripheral rim of the mask are connected together via a connecting edge, which connecting edge bears against the edge of the platform or against an immediate vicinity thereof, extending to the outer surface of the platform.

5. The assembly according to claim 4, wherein the edges of the platform and of the mask are substantially parallelogram-shaped.

6. The assembly according to claim 1, wherein the mask is reusable and the assembly further comprises a plurality of tabs that can be removed, or be cut off, independently of one another, a number of the tabs being equal to a predefined number of times the mask should be used.

7. A method of fabricating a reusable mask according to claim 1, comprising:

making the mask by injection molding between a mold and a countermold reproducing shapes and dimensions of both the platform and the one of the blade root and the attachment flange of the platform of the nozzle sector, so that the first cavity portion and the second cavity portion have shapes complementary, respectively, to the shape of the platform and said shape of one of the blade root and the attachment flange of the platform.

8. The assembly according to claim 1, wherein said side surface bears in a leaktight manner against the peripheral surface of the platform, and the peripheral rim further includes a free end surface flush with the outer surface of the platform along said edge.

\* \* \* \* \*